United States Patent
Cedro, III et al.

[11] Patent Number: 5,955,048
[45] Date of Patent: Sep. 21, 1999

[54] PROCESS FOR MAKING FLASH ACTIVATED HYDROTALCITE

[75] Inventors: Vito Cedro, III, Export; John M. Stinson, Jr., Murrysville; Mark L. Weaver, Allison Park, all of Pa.; James H. Richardson, Arlington Heights, Ill.

[73] Assignee: Aluminum Company of America, Pittsburgh, Pa.

[21] Appl. No.: 08/534,996

[22] Filed: Sep. 27, 1995

[51] Int. Cl.[6] .......................... C01B 25/26; C01B 31/30; C01B 21/48; C01F 7/02

[52] U.S. Cl. ................ 423/306; 423/420.2; 423/593; 423/600; 423/463; 423/395; 423/518; 423/367

[58] Field of Search ................. 423/420.2, 593, 423/594, 595, 599, 600, 463, 395, 518, 306, 367

[56] References Cited

U.S. PATENT DOCUMENTS

| | | |
|---|---|---|
| Re. 34,164 | 1/1993 | Misra . |
| 2,915,365 | 12/1959 | Saussol . |
| 3,222,129 | 12/1965 | Osment et al. . |
| 3,539,306 | 11/1970 | Kumura et al. . |
| 4,351,814 | 9/1982 | Miyata et al. . |
| 4,444,899 | 4/1984 | Yamada et al. . |
| 4,752,397 | 6/1988 | Sood ........................................ 210/662 |
| 4,867,882 | 9/1989 | O'Neill et al. ............................ 423/25 |
| 5,079,087 | 1/1992 | Lever et al. . |
| 5,096,871 | 3/1992 | Lever et al. . |
| 5,342,485 | 8/1994 | Armbrust, Jr. . |
| 5,362,457 | 11/1994 | Grubbs et al. .......................... 423/115 |
| 5,399,329 | 3/1995 | Schutz et al. . |
| 5,437,720 | 8/1995 | Cox et al. . |
| 5,445,808 | 8/1995 | Armbrust, Jr. . |

*Primary Examiner*—Steve Bos
*Attorney, Agent, or Firm*—Gary P. Topolosky

[57] ABSTRACT

There is provided a flash activated hydrotalcite which, when extruded to sizes of about 1/16 inch or more, has a crush load strength of at least about 7 pounds. The process for making this extrudate includes: (a) providing a hydrotalcite compound; (b) heating said compound for less than two seconds to one or more temperatures above about 482° C. (900° F.); (c) cooling said heated compound; (d) collecting said cooled compound; (e) forming said compound into an extrudate; and (f) reactivating said extrudate by heating to one or more temperatures above about 400° C. (752° F.) for about 20 minutes or more. Further strength improvements are achieved by exposing these extrudates to steam for at least about 8 hours prior to step (f).

9 Claims, 3 Drawing Sheets

PROCESS FOR MAKING FLASH ACTIVATED HYDROTALCITE

BACKGROUND OF THE INVENTION

1. Field of the Invention

This invention relates to a new mixed metal oxide material, in an extruded or spherical form, and process for making said material. More specifically, the invention relates to flash activated hydrotalcite for use as an improved adsorbent, viscosity enhancer, catalyst and/or catalyst support. The invention further relates to an improved process of manufacturing flash activated hydrotalcite powders and formed shapes, the latter having excellent crush load strengths.

2. Technology Review

Hydrotalcite exists in both a natural and synthetic form. Naturally occurring deposits have been found in Snarum, Norway and in the Ural Mountains. Typical occurrences are in the form of serpentines, talc schists, or where hydrotalcite forms the pseudomorph of a spinel. Like most ores, natural hydrotalcite is virtually impossible to find in a pure state. Such deposits often contain one or more other minerals including penninite and muscovite.

Several processs are known for making synthetic hydrotalcite in such product forms as a fine powder, −20 mesh granules or as ⅛-inch diameter extrudates. One representative process is described in U.S. Pat. No. 3,539,306. There, an aluminum hydroxide, aluminum-amino acid salt, aluminum alcoholate, water soluble aluminate, aluminum nitrate and/or aluminum sulfate are mixed with a magnesium component selected from magnesium oxide, magnesium hydroxide or water-soluble magnesium salt and a carbonate ion-containing compound in an aqueous medium maintained at a pH of 8 or more. The resulting product may be used as a stomach antacid. In this typical neutralization process, a fairly pure, finely sized hydrotalcite particle is formed. A serious disadvantage of this process, however, is formation of a sodium salt by-product. Said salt neutralization process could also produce a brucite-like structure with undesired anions (e.g. sulfate) or cations ($Na^+$).

In Misra Reissue U.S. Pat. No. 34,164, the disclosure of which is fully incorporated by reference, yet another means for synthesizing hydrotalcite is taught. That process comprises heating magnesium carbonate and/or magnesium hydroxide to form activated magnesia, then combining the activated magnesia with an aqueous solution of aluminate, carbonate and hydroxyl ions.

Other known processs for synthesizing hydrotalcite include: adding dry ice or ammonium carbonate to the thermal decomposition product from a magnesium nitrate-aluminum nitrate mixture, after which an intermediate product is subjected to temperatures below about 325° F. and pressures of 2,000 to 20,000 psi. Yet another process, from "Properties of a Synthetic Magnesium-Aluminum Carbonate Hydroxide and its Relationship to Magnesium-Aluminum Double Hydroxide Manasseite, and Hydrotalcite", *The American Mineralogist*, Vol. 52, pp. 1036–1047 (1967), produces hydrotalcite-like materials by titrating a solution of $MgCl_2$ and $AlCl_3$ with NaOH in a carbon dioxide-free system. This suspension is dialyzed for 30 days at 60° C. to form a hydrated Mg—Al carbonate hydroxide having the properties of both manasseite and hydrotalcite.

It is generally known to activate hydrotalcite materials by heating them between about 400–600° C. (752–1112° F.), and preferably at around 500° C. (932° F.), for about 15–60 minutes to drive off carbon dioxide and water from hydrotalcite's basic structure and make it more adsorptive. It is also known to process certain hydrotalcites to generate: needle-like structures, as per Miyata et al U.S. Pat. No. 4,351,814; sheet-like forms, as per Schutz et al U.S. Pat. No. 5,399,329; or spheroidal shapes, as per Cox et al U.S. Pat. No. 5,437,720.

It is a principal objective of this invention to provide means for enhancing the adsorption performance of hydrotalcite powders, said powders having an average particle diameter between about 1 and 100 microns. It is another main objective to provide a hydrotalcite, or hydrotalcite like material, in a more easily useable, transportable product form, such as an extrudate. It is yet another principal objective of this invention to provide an extruded, synthetic hydrotalcite which can withstand 7 lbs. or greater crush loads upon activation. Still another main objective is to provide a process for making commercial quantities of a flash activated (or flash calcined) hydrotalcite.

SUMMARY OF THE INVENTION

In accordance with the foregoing objectives and advantages, there is provided a flash activated hydrotalcite which, when extruded to sizes of about 1/16 inch or more, has a minimum crush load strength of about 7 pounds. The process for making such an extrudate includes: (a) providing a hydrotalcite compound; (b) flash activating, or rapidly heating, said compound for less than two seconds to one or more temperatures above about 482° C. (900° F.), or preferably to about 566° C. (1050° F.) or more; (c) cooling said heated compound; (d) collecting said cooled compound; (e) forming said compound into an extrudate; and (f) reactivating said extrudate by heating to one or more temperatures above about 400° C. (752° F.) for about 20 to 70 minutes or more. Further strength improvements are achieved by exposing these extrudates to hot water or water vapor for at least about 8 hours prior to step (f).

BRIEF DESCRIPTION OF THE ACCOMPANYING DRAWINGS

Further features, objectives and advantages of the present invention will become clearer from the following detailed description of preferred embodiments made with reference to the accompanying drawings in which:

FIGS. 1a and 1b are scanning electron microscopic (or SEM) photographs of a non-flash activated, ⅛ inch diameter hydrotalcite extrudate, dried at 110° C. (230° F.), as magnified 10,000× and 4,950×, respectively;

FIGS. 2a and 2b are SEM photographs of a flash-activated ⅛ inch diameter hydrotalcite extrudate, dried at 110° C. (230° F.), as magnified 10,000× and 4,950×, respectively; and FIG. 3 is a flow chart depicting the various process steps of this invention with optional steps depicted with dotted lines.

DETAILED DESCRIPTION OF PREFERRED EMBODIMENTS

Figure 1A:
Figure 1B:

As used herein, the following terms shall mean:

a. For the description of material compositions that follows, all references to percentages are by weight percent (wt. %) unless otherwise indicated.

b. When referring to any numerical range of values herein, such ranges are understood to include each and every number and/or fraction between the stated range minimum and maximum. A range of about 7–14 lbs. crush load strength, for example, expressly includes all intermediate values of about 7.01, 7.1, 7.2, 7.5 and 7.9 lbs. all the way up to and including 13.1, 13.5 and 13.99 lbs. The same applies to all other numerical, including temperature, ranges set forth herein.

c. When referring to minimum crush loads, it is to be understood that such minimum levels are those at which a material's load strength can be guaranteed or those on which a user can rely for design purposes, subject to a safety factor. Some minimum strengths have a statistical basis such that 99% of that product either conforms, or is expected to conform, to that minimum guarantee with 95% confidence. And while typical strengths may tend to run a little higher than these minimum guaranteed levels, they at least serve to illustrate an invention's improvement in crush load strength properties when compared to other product forms.

d. The term "LOI" refers to Loss on Ignition and equates to the measured loss in weight of a product sample, previously dried at 110° C. (230° F.), upon heating to about 1100° C. (2012° F.) for about 30 minutes.

e. The term "hydrotalcite" shall be understood to apply to the structural family of layered double hydroxides whose family members consist of any compound having the formula: $A_{1-x}B_x(OH)_2C_z \cdot mH_2O$, where: A represents a divalent metal cation; B represents a trivalent metal cation; C represents a mono- to polyvalent anion; and where x, z, m and n satisfy the following conditions: $0.09<x<0.67$; $z=x/n$, where n=the charge on, the anion; and $2>m>0.5$. When converting to whole numbers rather than fractional equivalents, preferred embodiments of this family have been identified by the formula: $A_6B_2(OH)_{16}C^{z-} \cdot 4H_2O$, wherein A is selected from: $Mg^{2+}$, $Ni^{2+}$, $Cu^{2+}$, $Ca^{2+}$, $Fe^{2+}$, $Co^{2+}$, $Sn^{2+}$, $Mn^{2+}$, $Cr^{2+}$, $Cd^{2+}$, $V^{2+}$ and $Zn^{2+}$; B from: $Al^{3+}$, $Fe^{3+}$, $Ga^{3+}$, $Co^{3+}$, $Mn^{3+}$, $Sc^{3+}$ and $Cr^{3+}$; and C from an anion list which includes: $OH^-$, $Cl^-$, $Br^-$, $NO_3^-$, $CH_3COO^-$, $CO_3^{2-}$, $SO_4^{2-}$, $PO_4^{3-}$, $Fe(CN)_6^{3-}$, $Fe(CN)_6^{4-}$ and some borates, carboxylates and polyoxometallates among other monovalent, divalent, and polyvalent inorganic and organic anions.

Some references refer to any compound with the aforementioned formulae as a "hydrotalcite". Others, however, divide this family of structural compounds into various subgroups depending on the divalent and trivalent cations within the alternating brucite-like layers. For example, pyroaurites have the basic formula: $Mg_6Fe_2(OH)_6CO_3 \cdot 4H_2O$. Such compounds are also known as "sjogrenites". Collectively, these other family members have been referred to as "hydrotalcite-like" compounds.

Yet another preferred definition for the term "hydrotalcite" includes any natural or synthetic compound satisfying the formulae: $Mg_6Al_2(OH)_{16}CO_3 \cdot 4H_2O$ or $Mg_4Al_2(OH)_{12}CO_3 \cdot 3H_2O$. This compound has sometimes been written as: $6MgO \cdot Al_2O_3 \cdot CO_2 \cdot 12H_2O$. In its ionic form, hydrotalcite may appear as: $[Mg_6Al_2(OH)_{16}]^{2+} \cdot [CO_3]^{2-} \cdot 4H_2O$. The main structural unit for this compound is brucite, or magnesium hydroxide $(Mg(OH)_2)$ having the form of an octagonal sheet with Mg ions positioned between multiple (OH) ions which share adjacent edges. By substituting trivalent aluminum ions for some of the divalent magnesium of this structure, sublayers of magnesium and aluminum are created while still maintaining brucite's basic sheet-like structure. To compensate for the charge imbalance from these aluminum ion substitutions, anions (indicated by letter "C" in the foregoing formulae) and water molecules are intercalated therein to form interlayers of $(C_z \cdot nH_2O)$ between the brucite-like structural layers. The anion having the greatest affinity to combine with water in this structure and form hydrotalcite is carbonate $(CO_3^{2-})$. Sulfate $(SO_4^{2-})$ is another compatible anion. Yet in other embodiments, a range of other materials may be intercalated into hydrotalcite's basic structure. For instance, the "C" of the foregoing formula may also be one or more of the following anions: $OH^-$, $Cl^-$, $Br^-$, $NO_3^-$, $CH_3COO^-$, $PO_4^{3-}$, $Fe(CN)_6^{3-}$, $Fe(CN)_6^{4-}$ and some borates, carboxylates and polyoxometallates among other monovalent, divalent, and polyvalent inorganic anions and monovalent organic carboxylic, dicarboxylate or polycarboxylate anions.

The spacial distribution of carbonate ions within hydrotalcite partially depends on how the $Al^{3+}$ ions substitute for the $Mg^{2+}$ ions therein. Brucite layer spacing is also a function of the amount or degree of aluminum substitution into hydrotalcite's basic structure. As aluminum substitution increases, interlayer spacing decreases due to an increase in the electrostatic attraction between positive hydroxide layers and hydrotalcite's negative interlayers. Interlayer thicknesses may also vary depending on the size and orientation of the anions substituted for some or all of the carbonate ions in hydrotalcite.

For preferred embodiments, a hydrotalcite material having a Mg:Al ratio of about 2(x=0.33) to 3(x=0.25) or higher is contemplated before flash activation. For the examples summarized in Table A below, the ratio of magnesium to aluminum in the starting hydrotalcite material was about 2.4:1, making x in the aforementioned formula equal to about 0.29. It is to be understood, however, that a variety of hydrotalcites may be made hereby, with Mg:Al ratios ranging from as low as about 0.5:1 to as high as about 10:1, for x values equal from about 0.50 to about 0.091.

Figure 3:
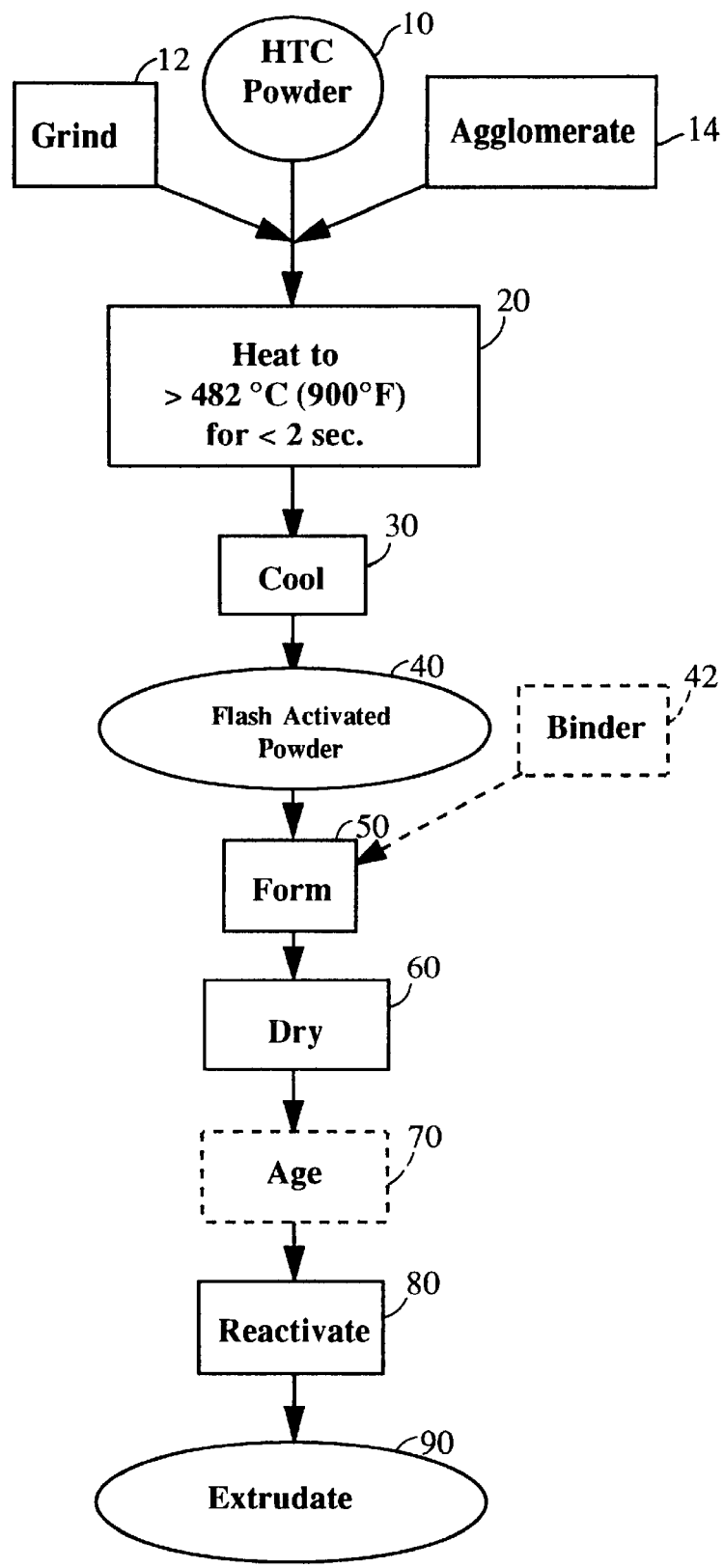

Referring now to FIG. 3, there is shown the flow chart of the preferred process steps for making the various product forms of this invention. For instance, if a fine powder is the preferred end result, the process commences by flash activating a hydrotalcite or hydrotalcite-like material, item 10. Depending on the size of the materials to be flash activated, some pregrinding 12 may be required of particles averaging greater than 100 microns in size, or some agglomerating 14 of particles less than 1 micron in size. On a preferred basis, hydrotalcite particles averaging about 5 to 20 microns in diameter are subjected to flash activation by the present invention.

These powders are next exposed to heating or flash activation 20, typically by injection into a hot gas stream for less than two seconds, and more preferably for 0.5 to 1 second total exposure. The gas stream itself is typically heated to one or more temperatures between about 816–1204° C. (1500–2200° F.). Upon contact with the cold powders passing therethrough, the temperature of these powders will rapidly rise and the gas stream temperature lower until both flash activated powder and contacted gas exit the heating chamber at about the same temperature, greater than 482° C. (900° F.), and more preferably at about 566° C. (1050° F.) or more. The heated powders are then typically collected or gathered for further processing by known means.

These powders are next allowed to cool 30. While this may be accomplished by passing powders through a preferably carbonate- and water vapor-free gas stream maintained at one or more temperatures between about 260–316° C. (500–600° F.), it is also possible to lower the temperatures of these flash activated materials 40 to a safer handling range of about 38–66° C. (100–150° F.) by passing them through known or subsequently developed heat transfer apparatus such as tube heat exchangers. When particle size is critical, the cooled powders may be run through a cyclone separator where the larger, coarser materials are gathered for subsequent grinding operations.

In some instances, it may be appropriate to enhance further forming operations by combining the flash activated hydrotalcite powders with one or more binders 42. After proper mixing, these blends of powders and binders are subjected to forming steps 50, including but not limited to extrusion and/or ball forming. For the former shaping operation, it has been observed that using flash activated hydrotalcites, as opposed to mere kiln- or pan-activated hydrotalcites, enhances materials handling, thus simplifying the process of making extrudates from flash activated hydrotalcite derivatives. The resulting product is then dried, step 60 in FIG. 3, by any known or subsequently developed technique.

Following drying, it has been observed with the present invention that a significant amount of strength, or crush load resistance, can be imparted to these extrudates by first artificially aging said materials. A preferred aging practice 70 includes exposing the materials to steam at about 90–200° C. (194–392° F.) for at least about 4 hours, and preferably for 6–16 hours or more. It is believed that such exposures promotes extensive rehydration of the flash activated extrudates thereby allowing such materials to exceed minimum crush loads of about 7 pounds for extrudates averaging 1/16 inch or more in diameter.

A final step of the aforementioned operation, step 80 in FIG. 3 reactivates the flash activated hydrotalcite extrudates, typically by kiln or pan exposure, to temperatures of about 400–700° C. (752–1292° F.). On a preferred basis, such reactivations should not exceed about 500° C. (932° F.) for total times of about 20 minutes to about 3 hours or more. Said process step drives off much of the water and carbonates that may have been readsorbed during the foregoing steps or during any unprotected storage of these extrudate materials 90.

Suitable end uses for the flash activated hydrotalcite products made by this process include acid neutralizers and scavengers, especially for polypropylene and polyethylene manufacturers, adsorbents for heavy metal anions from waste waters, stabilizing components for other polymer systems such as poly (vinyl chloride), flame retarders, smoke suppressers, catalysts, catalyst supports and viscosity control agents.

Further features, objects and advantages of the present invention will be made clearer from the detailed description of examples which follows. It is to be understood, however, that such examples are merely representative of this invention and should not be used to limit its scope in any manner.

EXAMPLES

For each of the examples summarized below, a hydrotalcite with a magnesium to aluminum ratio of 2.4 was used, thus the designation HTC-24 throughout Table A. In some instances, this material was extruded with various binders, such as the 2% methylcellulose additive mentioned below. A representative binder additive is Methocel® as sold by the Dow Chemical Company. It is to be understood, however, that other binder additives may be substituted therefor, or used in combination therewith.

TABLE A

| | Extrudates[1] | | | |
|---|---|---|---|---|
| | Crush Load[2] (lbs.) | | | |
| | No Post-Treatment | | Steamed[3] for about 10 hrs. | |
| Material (% solid fraction, (liquid fraction)) | Dry[4] | Reactv'd[5] | Dry[4] | Reactv'd[5] |
| Ex. 1 - 98% Flash Activ.HTC-24 and 2% methylcellulose binder (in water) | 13.0 ± 3.7 | 7.3 ± 3.0 | 17.1 ± 4.4 | 7.3 ± 2.2 |
| Ex. 2 - 100% Flash Activ.HTC-24 (in 3% acetic acid solution) | 11.9 ± 2.5 | 8.1 ± 1.8 | 11.3 ± 3.4 | 8.9 ± 2.7 |
| Ex. 3 - 98% HTC-24 and 2% methyl cellulose binder (in water - added slowly) | 5.5 ± 2.2 | 0.4 ± 0.3 | 7.0 ± 1.9 | 1.8 ± 0.9 |
| Ex. 4 - 98% HTC-24 and 2% methyl cellulose binder (in water - added quickly) | 6.3 ± 1.0 | 0.5 ± 0.3 | 6.0 ± 1.6 | 0.6 ± 0.4 |
| Ex. 5 - 90% HTC-24 and 10% bentonite (in water) | 2.1 ± 0.4 | 1.5 ± 0.6 | 2.8 ± 0.5 | 3.0 ± 1.0 |
| Ex. 6 - 100% HTC-24 (in a 3% H3PO4 solution) | 0.5 ± 0 | 0.5 ± 0.2 | 0.4 ± 0.2 | 0.4 ± 0.2 |
| Ex. 7 - 100% Flash Activ.HTC-24 (in water) | 28.8 | 16.1 | 19.63 | 28.01 |

[1] All materials for Examples 1–6 were extruded through a 1/16 inch die on a 2 inch extruder and all test specimens cut to a length of about 1/8 inch. For Example 7, a 1/8 inch die was used instead.
[2] For Examples 1–6; the foregoing values are averages of at least 10 crush tests performed per category using a Chatillon crush strength meter. For Example 7, only one such test was performed.
[3] Steaming was performed by sealing an as-extruded sample in a glass jar with a thin water layer at the bottom of the jar. The jar and sample were then placed in an oven heated to 105° C. (for Examples 1–6), and to 110° C. (for Example 7) and allowed to stand.
[4] Drying was performed at about 105° C.
[5] Reactivating was performed at about 500° C. for about 1 hour.

From the foregoing, it should be noted that a significant amount of crush load strengthening was observed after exposure of the flash activated hydrotalcite extrudates for about 4–16 hours to hot water (heated to about 90° C. (194° F.) or more) or water vapor/steam. Such aging practices yielded still stronger, crush resistant extruded pellets as per Example 7 in above Table A.

Having described the presently preferred embodiments, it is to be understood that the invention may be otherwise embodied within the scope of the appended claims.

What is claimed is:

1. A process for making flash activated hydrotalcite comprises:
   (a) providing a hydrotalcite compound having the formula:

$A_{1-x}B_x(OH)_2C_z \cdot mH_2O$, where A represents a divalent metal cation, B represents a trivalent metal cation, C represents a mono- to polyvalent anion, and x, z and m satisfy the following conditions: $0.09<x<0.67$; $z=x/n$, where n=the charge on the anion; and $2>m>0.5$;

(b) flash activating said compound for less than two seconds at one or more temperatures above about 482° C.; and (c) cooling said heated compound.

2. The process of claim 1 wherein the divalent metal cation is selected from the group consisting of: $Mg^{2+}$, $Ni^{2+}$, $Cu^{2+}$, $Ca^{2+}$, $Fe^{2+}$, $Co^{2+}$, $Sn^{2+}$, $Mn^{2+}$, $Cr^{2+}$, $Cd^{2+}$, $V^{2+}$ and $Zn^{2+}$.

3. The process of claim 1 wherein the trivalent metal cation is selected from the group consisting of: $Al^{3+}$, $Fe^{3+}$, $Ga^{3+}$, $Co^{3+}$, $Mn^{3+}$, $Sc^{3+}$ and $Cr^{3+}$.

4. The process of claim 1 wherein the mono- to polyvalent anion is selected from the group consisting of: $OH^-$, $Cl^-$, $Br^-$, $NO_3^-$, $CH_3COO^-$, $CO_3^{2-}$, $SO_4^{2-}$, $PO_4^{3-}$, $Fe(CN)_6^{3-}$, and $Fe(CN)_6^{4-}$.

5. A process for making a flash activated hydrotalcite extrudate comprises:
   (a) providing a hydrotalcite compound;
   (b) heating said compound for less than two seconds at one or more temperatures above about 482° C.;
   (c) cooling said heated compound;
   (d) collecting said cooled compound;
   (e) forming said compound into an extrudate; and
   (f) reactivating said extrudate by heating to one or more temperatures above about 400° C. (752° F.) for about 20 minutes or more.

6. The process of claim 5 which further includes exposing the extrudate to steam for at least about 8 hours prior to step (f).

7. The process of claim 5 wherein step (e) further includes blending the compound with one or more binders selected from the group consisting of: methyl cellulose, acetic acid and combinations thereof.

8. The process of claim 5 wherein said extrudate has a diameter of about 0.0625 inch or more and a crush load strength of about 7 lbs. or more upon reactivation.

Figure 2A:
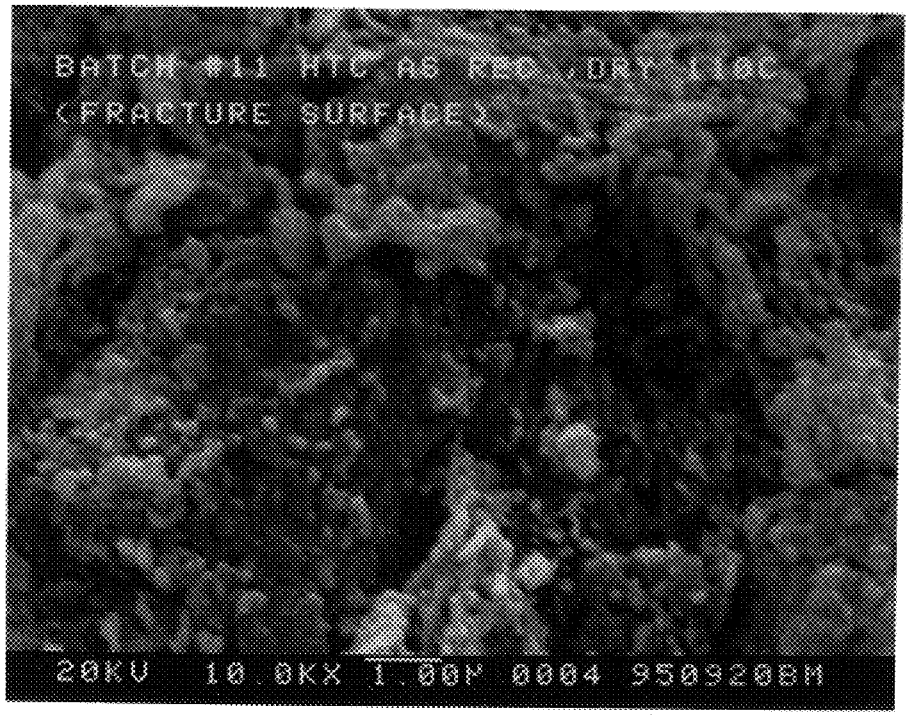
Figure 2B:

9. The process of claim 5 wherein said extrudate has an internal structure resembling the scanning electron micrographs at FIGS. 2a and 2b.

* * * * *